(12) United States Patent
Bae et al.

(10) Patent No.: US 9,764,273 B2
(45) Date of Patent: Sep. 19, 2017

(54) SYSTEM FOR ABSORBING AND SEPARATING ACID GASES

(71) Applicants: Hyundai Motor Company, Seoul (KR); Kia Motors Corporation, Seoul (KR); Korea Institute of Energy Research, Daejeon (KR)

(72) Inventors: Shin-Tae Bae, Hwaseong-si (KR); Yeoil Yoon, Daejeon-si (KR); Sungchan Nam, Daejeon-si (KR); Soonkwan Jung, Daejeon-si (KR); Sungyeoul Park, Daejeon (KR); Ilsoo Chun, Daejeon (KR); Youngeun Kim, Daejeon-si (KR)

(73) Assignees: Hyundai Motor Company, Seoul (KR); Kia Motors Corporation, Seoul (KR); Korea Institute of Energy Research, Daejeon (KR)

( * ) Notice: Subject to any disclaimer, the term of this patent is extended or adjusted under 35 U.S.C. 154(b) by 522 days.

(21) Appl. No.: 14/319,669

(22) Filed: Jun. 30, 2014

(65) Prior Publication Data

US 2015/0132195 A1  May 14, 2015

(30) Foreign Application Priority Data

Nov. 12, 2013  (KR) .................... 10-2013-0136650

(51) Int. Cl.
 *B01D 53/14* (2006.01)
 *B01D 53/96* (2006.01)
 (Continued)

(52) U.S. Cl.
 CPC ..... *B01D 53/1475* (2013.01); *B01D 53/1425* (2013.01); *B01D 53/18* (2013.01); *B01D 53/62* (2013.01); *B01D 53/96* (2013.01); *B01D 2251/30* (2013.01); *B01D 2251/606* (2013.01); *B01D 2252/2023* (2013.01); *B01D 2252/20478* (2013.01); *B01D 2252/30* (2013.01);
 (Continued)

(58) Field of Classification Search
 None
 See application file for complete search history.

(56) References Cited

U.S. PATENT DOCUMENTS

| | | | | |
|---|---|---|---|---|
| 5,403,569 A | * | 4/1995 | Abdelmalek | ........ B01D 53/002 423/220 |
| 2004/0265199 A1 | * | 12/2004 | MacKnight | ........ B01D 53/0454 423/220 |

FOREIGN PATENT DOCUMENTS

| | | |
|---|---|---|
| JP | 2013-527363 A | 6/2013 |
| KR | 10-2002-0026536 A | 4/2002 |
| KR | 10-2012-0000979 | 1/2012 |

* cited by examiner

*Primary Examiner* — Amber R Orlando
*Assistant Examiner* — Phillip Shao
(74) *Attorney, Agent, or Firm* — Morgan, Lewis & Bockius LLP

(57) ABSTRACT

A system for absorbing and separating acid gases may include an absorbing tower in which a gas containing an acid gas is supplied, a recycling tower that is disposed close to the absorbing tower, an absorbent that absorbs an acid gas in the absorbing tower and discharges the acid gas back to the recycling tower while circulating through the absorbing tower and the recycling tower, and a condenser that is connected to the recycling tower and condenses an acid gas produced in the recycling tower, wherein a centrifugal separator that separates the absorbent, using a centrifugal force, is disposed at a lower portion in the absorbing tower.

9 Claims, 3 Drawing Sheets

(51) Int. Cl.
   *B01D 53/18* (2006.01)
   *B01D 53/62* (2006.01)
(52) U.S. Cl.
   CPC .. *B01D 2252/504* (2013.01); *B01D 2257/302* (2013.01); *B01D 2257/304* (2013.01); *B01D 2257/504* (2013.01); *Y02C 10/04* (2013.01); *Y02C 10/06* (2013.01)

SYSTEM FOR ABSORBING AND SEPARATING ACID GASES

CROSS-REFERENCE TO RELATED APPLICATION

The present application claims priority to Korean Patent Application No. 10-2013-0136650 filed on Nov. 12, 2013, the entire contents of which is incorporated herein for all purposes by this reference.

BACKGROUND OF THE INVENTION

Field of the Invention

The present invention relates to a system for absorbing and separating acid gases which absorbs and separates acid gases from an exhaust gas rich with acid gases such as carbon dioxide, using an absorbent, and separately collect the separated acid gases in a restoring tank.

Description of Related Art

Technologies of processing acid gases such as carbon dioxide, sulfur dioxide, and hydrogen sulfide are required in industrial fields. In particular, they have made great efforts to reduce the exhaust amount of carbon dioxide that occupies most of greenhouse gas in order to follow regulations for reducing greenhouse gas.

In those efforts, a method of reducing carbon dioxide by restoring and storing it is being actively studied, because of the advantage that the restored carbon dioxide can be reused.

However, since the method of restoring and storing carbon dioxide generally uses a chemical absorbing method that absorbs carbon dioxide and then separates and restores it, a lot of energy is consumed to recycle the absorbent that has absorbed carbon dioxide, such that there is a burden of an increase in process cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for absorbing and separating acid gases which reduces energy for recycling an absorbent and decreases the whole process cost by separating a carbon dioxide-saturated absorbent and a carbon dioxide-unsaturated absorbent from an absorbent that has absorbed carbon dioxide in acid gases.

In an aspect of the present invention, a system for absorbing and separating acid gases, may include an absorbing tower in which a gas containing an acid gas is supplied, a recycling tower that is disposed close to the absorbing tower, an absorbent that absorbs an acid gas in the absorbing tower and discharges the acid gas back to the recycling tower while circulating through the absorbing tower and the recycling tower, and a condenser that is connected to the recycling tower and condenses an acid gas produced in the recycling tower, wherein a centrifugal separator that separates the absorbent, using a centrifugal force, is disposed at a lower portion in the absorbing tower.

The centrifugal separator may include a rotor rotatably disposed in the lower portion of the absorbing tower, a rotary shaft connected with the rotor, and a torque source connected to the rotary shaft and rotating the rotary shaft. The rotor is disposed in the lower portion of the absorbing tower, the torque source is disposed outside the absorbing tower, and the rotary shaft is disposed through the absorbing tower.

The torque source may include a motor connected to the rotary shaft.

The torque source may include a wind power torque source that rotates the rotor, using a force of wind.

The torque source may include a wind power propeller rotated by the force of the wind, a gear box coupled to the wind power propeller and adjusting a rotation ratio inputted from the wind power propeller, and a belt engaging the gear box and the rotary shaft and transmitting torque outputted from the gear box to the rotary shaft.

In the absorbing tower, a first end of a first outlet through which an acid gas-unsaturated absorbent separated by the rotor is discharged is formed adjacent to an extension line from a rotational axis of the rotor, and a second outlet through which an acid gas-saturated absorbent separated by the rotor is discharged is formed further away from the extension line from the rotational axis of the rotor than the first end of the first outlet.

The first outlet is formed at a bottom of the absorbing tower which is close to where the rotary shaft passes through the absorbing tower and the second outlet is formed at a side of the absorbing tower.

A second end of the first outlet is connected to a recirculation line connected to an upper portion of the absorbing tower.

The first outlet is connected to the recycling tower.

The absorbent is a mixture of an absorbent of alkalanoimine and alkali carbonate with a solvent of alcohol, water, ethylene glycol, ionic liquid, and is chemically separated when absorbing an acid gas.

The acid gas may include carbon dioxide.

According to an exemplary embodiment of the present invention, it is possible to reduce energy for recycling and decrease the entire process cost by separating a carbon dioxide-saturated absorbent and a carbon dioxide-unsaturated absorbent from an absorbent that has absorbed an acid gas such as carbon dioxide.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
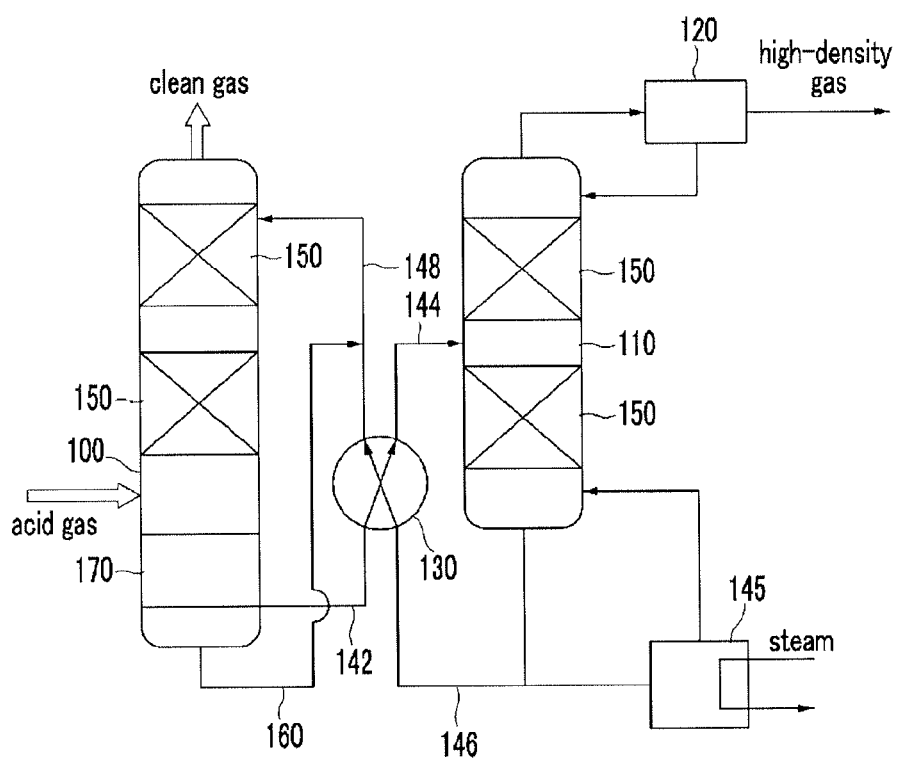
FIG. 1 is a schematic diagram of a system for absorbing and separating carbon dioxide.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described. The exemplary embodiments, however, provided as examples, and the present invention is not limited thereto, but defined within the range of claims to be described below.

A system for absorbing and separating carbon dioxide according to an exemplary embodiment is described with reference to FIG. 1 and a method of absorbing and separating carbon dioxide which uses the system for absorbing and separating carbon dioxide is described together.

FIG. 1 is a schematic diagram of a system for absorbing and separating carbon dioxide.

Referring to FIG. 1, a system for absorbing and separating carbon dioxide includes an absorbing tower 100, a heat exchanger 130, a recycling tower 110, a filler 150, a condenser 120, a reheater 145, a first line 142, a second line 144, a third line 146, and a fourth line 148.

Main constituent elements for explaining the present invention are described herein, and technologies known in the art are referred for other constituent elements and the detailed structure and the control method are not described.

In the absorbing tower 100, a carbon dioxide-rich gas is supplied to the lower portion and a clean gas with carbon dioxide removed is discharged from the upper portion.

An absorbent (without reference numeral) circulates through the first line 142, the heat exchanger 130, the second line 144, the recycling tower 110, the third line 146, the heat exchanger 130, the fourth line 148, and the absorbing tower 100.

The first line 142 and the second line 144 carry an absorbent absorbing carbon dioxide collecting at the lower portion of the absorbing tower 100 to the upper portion of the recycling tower 110, while the third line 146 and the fourth line 148 carry a recycled absorbent collecting at the lower portion of the recycling top 110 to the upper portion of the absorbing tower 100.

The heat exchanger 130 disposed at the intersection of the lines 142, 144, 146, and 148 adjusts the temperature of the absorbent by exchanging heat.

The absorbent supplied to the absorbing tower 100 absorbs carbon dioxide while moving down, and the absorbent supplied to the recycling tower 100 discharges carbon dioxide in a gas type.

The absorbent is reheated through the reheater 145 and circulates through a reheating line (without reference numeral), and the filler in the absorbing tower 100 and the recycling tower 110 improves the efficiency of absorbing and recycling by reducing the speed of the absorbent moving down.

In an exemplary embodiment of the present invention, a separator 170 that separates the absorbent moving down in the absorbing tower 100 into a carbon dioxide-saturated absorbent and a carbon dioxide-unsaturated absorbent.

The carbon dioxide-saturated absorbent separated by the separator 170 is supplied to the recycling tower 110 through the first and second lines 142 and 144 and the carbon dioxide-unsaturated absorbent circulates back to the absorbing tower 100 through the recirculation line 160, such that the lifespan of the absorbent can be increased and the entire process cost can be reduced.

Figure 2:
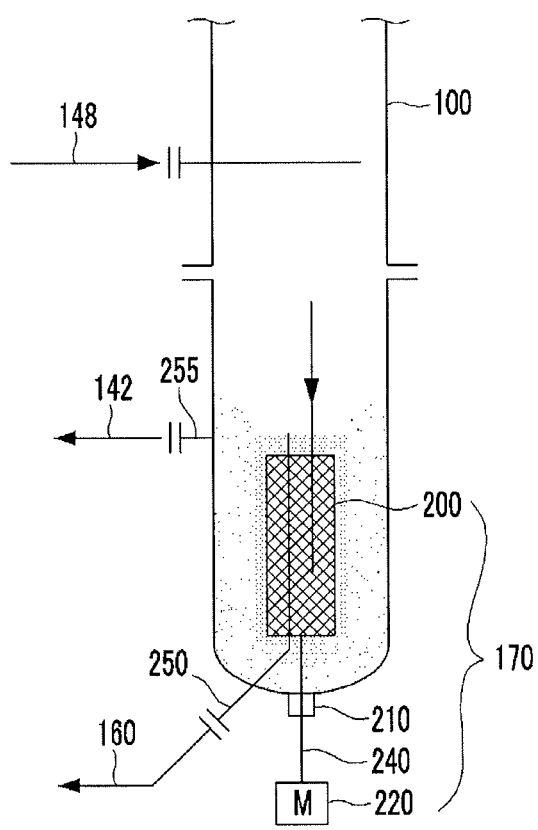
FIG. 2 is a partial schematic diagram of the system for absorbing and separating carbon dioxide according to an exemplary embodiment of the present invention.
Figure 3:
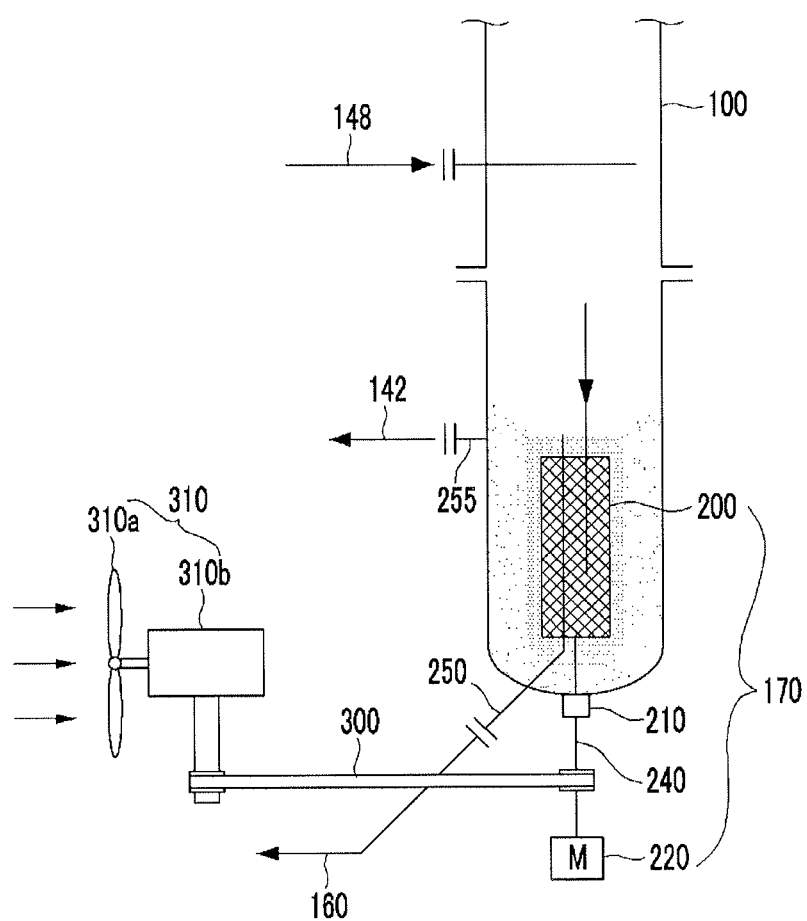
FIG. 3 is a partial schematic diagram of a system for absorbing and separating carbon dioxide according to another exemplary embodiment of the present invention.

The detailed structure and principle of the system is described hereafter with reference to FIGS. 2 and 3.

FIG. 2 is a partial schematic diagram of the system for absorbing and separating carbon dioxide according to an exemplary embodiment of the present invention.

Referring to FIG. 2, the system for absorbing and separating carbon dioxide includes the absorbing tower 100, a rotor 200, a shaft 240, a motor 220, a sealing member 210, a first outlet 250, a recirculation line 160, a second outlet 255, and the first line 142.

An absorbent with carbon dioxide removed is supplied to the upper portion of the absorbing tower 110 through the fourth line 148, the first outlet 250 is formed at the bottom, and the second outlet 255 is formed at a side of the lower portion.

The first outlet 250 is connected with the upper portion of the absorbing tower 100 through the recirculation line 160 and the second outlet 255 is connected to the upper portion of the recycling tower 110 through the first line 142 and the heat exchanger 130.

The shaft 240 is disposed vertically through the center of the bottom of the absorbing tower 100, the lower end of the shaft 240 is connected with the motor 220, and the rotor 200 is disposed at the portion inserted in the absorbing tower 100.

The sealing member 210 such as a mechanical seal is disposed where the shaft 240 passes through the absorbing tower 100, so it prevents an absorbent etc. from leaking out of the absorbing tower 100 along the shaft 240.

As a control unit (without reference numeral) drives the motor 220 through a power unit (without reference numeral), the shaft 240 rotates the rotor 200.

The carbon dioxide-saturated absorbent with relatively high density moves outward due to centrifugal force by the rotor 200 and the carbon dioxide-unsaturated absorbent with relatively low density moves down.

Therefore, the carbon dioxide-unsaturated absorbent circulates back to the absorbing top 100 through the first outlet 250 and the recirculation line 160 and the carbon dioxide-saturated absorbent circulates back to the upper portion of the recycling tower 110 through the second outlet 255 and the first line 142.

FIG. 3 is a partial schematic diagram of a system for absorbing and separating carbon dioxide according to another exemplary embodiment of the present invention.

The parts with different features from those of FIG. 2 are described with reference to FIG. 3 and detailed description of similar parts is not provided.

Referring to FIG. 3, a wind power torque source 310 using the power of wind is disposed close to the absorbing tower 100 and includes a wind power impeller 310a, a wind power gear box 310b, and a belt 300.

As the wind power impeller 310a is rotated by the force of wind, the shaft 240 is rotated by the wind power gear box 310b and the belt 300

Accordingly, the torque of the motor 220 increases and rotates the rotor 200 at a predetermined speed.

In an exemplary embodiment of the present invention, it is possible to rotate the shaft 240 with the wind power torque source 310 and adjust the torque of the shaft 240, using the motor 220.

Further, when the wind power torque source 310 rotates the shaft 240 over a predetermine speed, the motor 220 can reduce the rotation speed of the shaft 240 by functioning as a generator and generate electric energy, using spare wind energy.

The absorbent may be a mixture of alkanolamine, alkali carbonate with higher alcohol, water, ethylene glycol, non-volatile ionic liquid and can be bonded with carbon dioxide.

The absorbent may have density higher than the carbon dioxide-unsaturated absorbent. In absorption reaction with carbon dioxide, the absorbent has the type of carbamate and bicarbonate and increases in density more than before the absorption reaction.

The carbon dioxide-saturated absorbent shows a feature of relatively large absorption amount of carbon dioxide, that is, high density, while the carbon dioxide-unsaturated absorbent shows a feature of no absorption amount of carbon dioxide or relatively less, that is, low density.

In detail, the carbon dioxide saturation of the carbon dioxide-unsaturated absorbent may be 0.1-5 wt % or less and the carbon dioxide saturation of the carbon dioxide-saturated absorbent may be 20-90 wt % or less.

A more intense carbon dioxide absorption reaction occurs at the lower portion of the absorbing tower 100 where a gas containing carbon dioxide meets a liquid absorbent than the upper portion of the absorbing tower 100 where a liquid absorbent is injected.

Accordingly, the carbon dioxide-unsaturated absorbent remains at the upper portion of the absorbing tower 100 due to the density difference of the absorbents, such that it is possible to reduce the cost for the installation and space by installing a centrifugal absorbent separator in the lower portion of the absorbing tower 100.

In the wind power torque source 310, the wind power impeller 310a may have a propeller-shaped or a cylindrical structure, and the belt 300 may be replaced by a gear and a shaft to transmit the generated wind power to the shaft 240.

The outlet through which the gas with carbon dioxide removed is discharged may be at the top of the absorbing tower 100, and the second outlet 255 through which the carbon dioxide-saturated absorbent is discharged and the first outlet 250 through which the carbon dioxide-unsaturated absorbent is discharged may be at the side and the bottom of the absorbing tower 100, respectively.

Since centrifugal separation of an absorbent occurs in the absorbing tower 100, the first and second outlets 250 and 255 may be disposed at different positions in accordance with the density difference of absorbents.

In detail, the carbon dioxide-saturated absorbent with high density may be discharged through the second outlet 255 far from the center of the diameter of the absorbing tower 100, in comparison to the carbon dioxide-unsaturated absorbent with low density.

The carbon dioxide-unsaturated absorbent discharged through the first outlet 250 has a small carbon dioxide absorption amount, so a centrifugal separator is not needed and it may flow back into the upper portion of the absorbing tower 100.

Accordingly, only the saturated absorbent is selectively recycled by improving the loss of heat due to heating the entire absorbent to recycle even the unsaturated absorbent, such that the process efficiency can also be increased.

Further, since the whole absorbent in the absorbing tower 100 is not sent to the recycling tower 110, but the saturated absorbent is sent to the recycling tower 110 and the unsaturated absorbent is sent back to the absorbing tower 100, the power energy of a pump (without reference numeral) can be reduced.

The carbon dioxide-saturated absorbent discharged through the second outlet 255 of the absorbing tower 100 is pre-heated through the heat exchanger 130 and sent into the recycling tower 110, and then it can be separated from carbon dioxide and recycled to be reused in the recycling tower 110.

The carbon dioxide-saturated absorbent flowing in the recycling tower 110 can be recycled and the absorbent recycled and then discharged from the recycling tower 110 can be pre-heated by the reheater 145 in which steam flows, and then it can flow into the lower portion of the recycling tower 110.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system for absorbing and separating acid gases, comprising:
   an absorbing tower in which a gas containing an acid gas is supplied;
   a recycling tower that is disposed close to the absorbing tower;
   an absorbent that absorbs an acid gas in the absorbing tower and discharges the acid gas back to the recycling tower while circulating through the absorbing tower and the recycling tower; and
   a condenser that is connected to the recycling tower and condenses an acid gas produced in the recycling tower,
   wherein a centrifugal separator that separates the absorbent, using a centrifugal force, is disposed at a lower portion in the absorbing tower,
   wherein the centrifugal separator includes a rotor rotatably disposed in the lower portion of the absorbing tower, a rotary shaft connected with the rotor, and a torque source connected to the rotary shaft and rotating the rotary shaft,
   wherein the torque source includes a wind power torque source that rotates the rotor, using a force of wind, and the torque source includes a wind power propeller rotated by the force of the wind, a gear box coupled to the wind power propeller and adjusting a rotation ratio inputted from the wind power propeller, and a belt engaging the gear box and the rotary shaft and transmitting torque outputted from the gear box to the rotary shaft.

2. The system of claim 1, wherein the rotor is disposed in the lower portion of the absorbing tower, the torque source is disposed outside the absorbing tower, and the rotary shaft is disposed through the absorbing tower.

3. The system of claim 1, wherein the torque source includes a motor connected to the rotary shaft.

4. The system of claim 1, wherein:
in the absorbing tower, a first end of a first outlet through which an acid gas-unsaturated absorbent separated by the rotor is discharged is formed adjacent to an extension line from a rotational axis of the rotor, and
a second outlet through which an acid gas-saturated absorbent separated by the rotor is discharged is formed further away from the extension line from the rotational axis of the rotor than the first end of the first outlet.

5. The system of claim 4, wherein the first outlet is formed at a bottom of the absorbing tower which is close to where the rotary shaft passes through the absorbing tower and the second outlet is formed at a side of the absorbing tower.

6. The system of claim 4, wherein a second end of the first outlet is connected to a recirculation line connected to an upper portion of the absorbing tower.

7. The system of claim 4, wherein the first outlet is connected to the recycling tower.

8. The system of claim 1, wherein the absorbent is a mixture of an absorbent of alkalanoimine and alkali carbonate with a solvent of alcohol, water, ethylene glycol, ionic liquid, and is chemically separated when absorbing an acid gas.

9. The system of claim 1, wherein the acid gas includes carbon dioxide.

* * * * *